(12) United States Patent
Gastal et al.

(10) Patent No.: US 11,612,970 B2
(45) Date of Patent: Mar. 28, 2023

(54) DEVICE FOR ASSEMBLING A TURBINE ENGINE, AND METHOD USING THE DEVICE

(71) Applicant: SAFRAN AIRCRAFT ENGINES, Paris (FR)

(72) Inventors: Thierry Fernand Gastal, Moissy-Cramayel (FR); Morgan Bryan Antony Creuset, Moissy-Cramayel (FR); Eric Louis Charles Petit, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 118 days.

(21) Appl. No.: 16/652,594

(22) PCT Filed: Sep. 24, 2018

(86) PCT No.: PCT/FR2018/052328
§ 371 (c)(1),
(2) Date: Mar. 31, 2020

(87) PCT Pub. No.: WO2019/068985
PCT Pub. Date: Apr. 11, 2019

(65) Prior Publication Data
US 2020/0230754 A1    Jul. 23, 2020

(30) Foreign Application Priority Data
Oct. 6, 2017   (FR) ........................ 1759371

(51) Int. Cl.
*B23P 15/04*   (2006.01)
*F01D 25/28*   (2006.01)
*F02C 3/04*   (2006.01)

(52) U.S. Cl.
CPC ............ *B23P 15/04* (2013.01); *F02C 3/04* (2013.01); *F01D 25/285* (2013.01); *F05D 2230/64* (2013.01)

(58) Field of Classification Search
CPC ......... B23P 19/02; B23P 19/022; B23P 19/04; B23P 19/10; B23P 15/04; F01D 25/28; F01D 25/285; F05D 2230/64
See application file for complete search history.

(56) References Cited

U.S. PATENT DOCUMENTS 6,364,634 B1   4/2002   Svihla et al.
9,709,067 B2   7/2017   Chekansky et al.
(Continued)

FOREIGN PATENT DOCUMENTS

CN   104246149 A   12/2014
CN   104769232 A   7/2015
(Continued)

OTHER PUBLICATIONS

English translation of Chinese Search Report dated Feb. 28, 2022, issued in corresponding Chinese Patent Application No. 201880064345X, filed on Sep. 24, 2018, 2 pages.
(Continued)

*Primary Examiner* — Christopher J Besler
(74) *Attorney, Agent, or Firm* — Christensen O'Connor Johnson Kindness PLLC (57) ABSTRACT

A device for assembling a turbine engine is configured for centering a shaft of a second module relative to a longitudinal axis of a hollow hub placed in front of a first module, the first module including a longitudinal cavity opening at the front into the hollow hub and passing through the first module until a rear end, the shaft configured to be inserted into the longitudinal cavity. The device includes a centering element and a guiding tube. The centering element is con-
(Continued)

figured to be placed in the hollow hub. The guiding tube is configured to enter into at least one portion of the longitudinal cavity of the first module. The device is arranged so that the guiding tube slides inside the centering element. The invention also relates to the assembly formed by the device and a calibration jig, as well as an assembly method using same.

13 Claims, 6 Drawing Sheets

(56) References Cited

U.S. PATENT DOCUMENTS

| | | | |
|---|---|---|---|
| 9,751,195 | B2 | 9/2017 | Tailpied |
| 2007/0044307 | A1 | 3/2007 | Bergerot et al. |
| 2009/0288291 | A1 | 11/2009 | Ziekow et al. |
| 2013/0318781 | A1* | 12/2013 | Mariano ............... F01D 25/285 29/700 |
| 2017/0044926 | A1 | 2/2017 | Lummer |

FOREIGN PATENT DOCUMENTS

| | | |
|---|---|---|
| CN | 106437878 A | 2/2017 |
| EP | 1655457 A1 | 5/2006 |
| EP | 1752409 A2 | 2/2007 |
| EP | 1757777 A1 | 2/2007 |
| FR | 3016337 A1 | 7/2015 |

OTHER PUBLICATIONS

Written Opinion of the International Searching Authority dated Jan. 27, 2020, issued in corresponding International Application No. PCT/FR2018/052328, filed Sep. 24, 2018, 6 pages.

International Preliminary Report on Patentability dated Apr. 8, 2020, issued in corresponding International Application No. PCT/FR2018/052328, filed Sep. 24, 2018, 7 pages.

International Search Report dated Jan. 2, 2019, issued in corresponding International Application No. PCT/FR2018/052328, filed Sep. 24, 2018, 8 pages.

Written Opinion of the International Searching Authority dated Jan. 2, 2019, issued in corresponding International Application No. PCT/FR2018/052328, filed Sep. 24, 2018, 6 pages.

* cited by examiner

DEVICE FOR ASSEMBLING A TURBINE ENGINE, AND METHOD USING THE DEVICE

FIELD OF THE INVENTION

The present invention relates to the field of turbine engines and, in particular, to multibody gas turbine engines. It relates to operations of assembling engines and in particular, to mounting the low-pressure turbine module on a high-pressure body.

STATE OF THE ART

The state of the art comprises, in particular, documents US-A1-2009/288291 and EP-A1-1 757 777.

A double-body turbine engine, with a front fan for example, comprises a high-pressure body, termed HP body, and a low-pressure body, termed LP body. The LP body, downstream from the HP body, rotates at a first speed and comprises a low-pressure turbine which drives the front fan. In this document, upstream and downstream, respectively the front and the rear, are defined relative to the general direction of the flow of the gases in the turbine engine. The HP body rotates at a different speed from that of the low-pressure turbine. The shafts of the two bodies are concentric and the shaft of the LP body passes through the inside of the shaft of the HP body. The shaft of the LP body is guided in rotation by bearings supported by the fixed structure of the engine, located respectively at the rear of the turbine and in front of the high-pressure compressor. The shaft of the HP body is guided in rotation by bearings supported by the fixed structure of the engine. In the type of turbine engine to which the invention relates, there is no bearing at the rear of the HP body connecting the shaft of the HP body and the shaft of the LP body. The shaft of the LP body therefore freely passes through the HP body forwards until it is supported by the upstream bearings.

Figure 1:
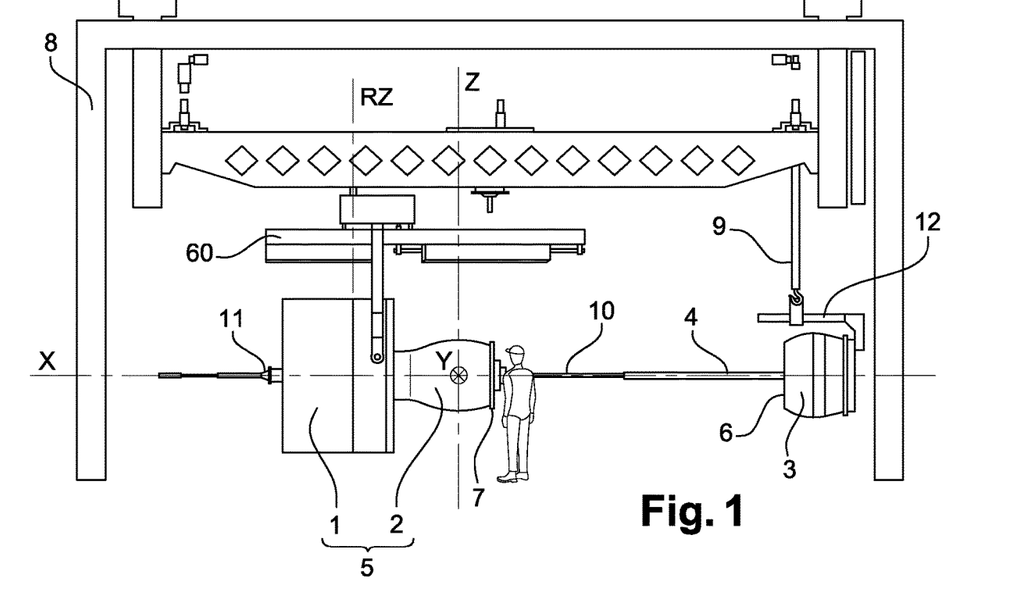
FIG. 1 shows a turbine engine during the docking of a second module on a first module.

FIG. 1 shows a turbine engine of this type during mounting. Here, this is a bypass and double-body turbine engine, comprising a front fan body 1, a HP body 2 with the shaft thereof, which cannot be seen in FIG. 1, and the LP module 3, with the shaft 4 thereof, termed LP shaft. The front fan body 1 and the HP body 2 are already assembled and form a module 5, termed first module. In the figure, the docking of the LP module 3 on the first module 5 is in the process of being carried out.

By the term docking, this means, here, all or a part of the movement in translation along the longitudinal axis X of the first module 5, of the LP module 3 until the flange 6 of its outer casing comes into contact with the corresponding flange 7 of the HP body 2.

During the docking operation, the LP shaft 4 must pass through the HP body 2 without contact, typically with a minimum clearance of 0.5 mm at the level of the shaft, to guarantee that the anticorrosion coating of the LP shaft or inside the first module is not damaged, and a clearance of 0.08 mm at the level of the labyrinth seals. The labyrinth seals, not shown in FIG. 1, are sealing devices placed between the HP body 2 and the LP body 3, each comprising an element rotating with the shaft of the HP body and an element rotating with the LP shaft. These elements are assembled during the docking, when the flanges 6 and 7 of the HP body 2 and of the LP body 3 are in contact.

In the example of FIG. 1, the docking is carried out horizontally. The first module 5 is suspended from a gate 8 by way of a trolley 60 such that the longitudinal axis X is horizontal. It can also be supported by a carriage or a pedestal.

The LP module 3, fixed to a rudder 12, is moved along the longitudinal axis X by means of a hoist 9 movably fixed to the gate 8, to pass through the first module 5 until contact of the two flanges 6 and 7.

In a known manner, a shaft guide 10 is fixed at the end of the LP shaft 4 so as to extend it forwards. This shaft guide 10 is thinner than the LP shaft 4 and can progress inside the first module 5 until reaching a centring unit 11 placed at the front of the first module 5. Once in the centring unit 11, the shaft guide 10 can guide the progression of the LP shaft 4 along the longitudinal axis X.

During the progression of the shaft guide 10 and the LP shaft 4 until the coupling of the flanges 6 and 7, it is necessary to ensure the precision of the guiding so that contacts of these elements with these of an inner part of the first module 5 does not lead to the degradation of the paint of the coating ensuring that the material of the parts or of the shaft does not corrode, or that the labyrinth seals are not damaged, or that too high stresses are not applied.

However, the LP module 3 is heavy (typically 1200 kg) and the risk of swinging and misalignment of the LP shaft 4 during docking is major.

Each pulse of the hoist 9 causes an uncontrolled movement of the LP module 3 by a swing effect. There is also a risk of misalignment in the vertical axis RZ (connection between the gate 8 and the trolley 60) by the mechanical clearance of the trolley 60 supporting the module 5 and a risk of misalignment in the transversal horizontal axis Y, by the clearance between the holding pins of the module 5 and the trolley 60.

This leads to using, to achieve the centring, quite heavy devices and long procedures comprising numerous handlings to regularly rectify the alignment of the modules 5 and 3.

There is therefore a need to provide a tool making it possible to respect the centring stresses while overcoming the abovementioned problems.

In addition, such a tool must be usable on different means for carrying modules of the turbine engine, whether as a new mounting or a repair.

It is also useful that the tool makes it possible to carry out the function of easing the LP module 3 on the first module 5 during docking, then a function of extracting the LP module 3 with the shaft 4 thereof, for example during a dismounting for repair operations.

SUMMARY OF THE INVENTION

To this end, the invention relates to a device for the assembly of a turbine engine, intended to centre a shaft of a second module relative to a longitudinal axis of a hollow central hub placed at the front of a first module, the front and the rear being defined relative to the general direction of flow of the gases in the turbine engine, said first module comprising a longitudinal cavity following said axis, opening at the front in said hollow hub and passing through the first module following the longitudinal axis to a rear end, said shaft needing to be inserted into said longitudinal cavity by said rear end, comprising a central axis centring element, comprising ends and configured to be placed in said hollow hub by inserting it through a first of the ends thereof and to cooperate with the latter to make the central axis thereof coincide with said longitudinal axis, characterised in that it further comprises a guiding tube configured to be able to enter into at least one portion of the longitudinal cavity of the first module, to the rear of the hollow hub, and in that the device is arranged so that the guiding tube slides inside the centring element along said central axis, between a first position, wherein the guiding tube is entirely on the side of the centring element relative to said first end, and a rear position, wherein the guiding tube stands proud from said first end, so as to penetrate into the longitudinal cavity when the centring element is placed in the hollow hub.

The first position of the guiding tube makes it possible to insert the centring element in the hollow hub without risking damaging an inner coating of the first module by contact with the guiding tube. The rear position of the guiding tube makes it possible to search, as far as possible in the second module, for the shaft or a shaft guide placed at the end of the shaft, to limit the amplitude of the swinging during movements. In addition, the additional guiding length ensured by the guiding tube in which the shaft guide can slide makes it possible to obtain precise axial guiding of the shaft. In particular, at the end of docking, this makes it possible to ensure the engagement of labyrinth seals. The handlings are thus clearly simplified by avoiding systematic centring verifications.

Advantageously, in the rear position, the guiding tube is sunk at least to the middle of the HP body in a turbine engine such as described in the introduction.

Preferably, a first end of the guiding tube is adapted to go back into the centring element through a second end of the latter, opposite the first end following the central axis, such that the first position of the guiding tube corresponds to the disconnection thereof of the centring element.

This makes it possible to decrease the weight and the volume of the element to be introduced first into the hollow hub, by limiting it just to the centring element, and therefore by facilitating the handling of the different portions of the tool.

Advantageously, the centring element comprises first means intended to engage by contact with the hollow hub, located at said first end of the centring element, and two means located in the proximity of an end opposite the first end according to the central axis and intended to cooperate by locking, for example an engaged connection, with the hollow hub.

The distance between the first and second means makes it possible to take advantage of the length of the centring element to obtain the desired precision on the centring. The connection by contact on the first end makes it possible the centre the centring element and to maintain it in the hollow hub with ease, this end not being visible when the element is inserted. Moreover, the limiting of the fixing means only to the two ends makes it possible to limit the surfaces to be adapted to the contacts and to treat the remainder of the inner surface of the hollow hub with an anti-corrosion coating similar to the remainder of the walls of the longitudinal cavity.

Preferably, the device further comprises a shaft guide arranged to be able to be inserted through a first end into the guiding tube and to be fixed to said shaft of the second module through a second end, the device being configured so that the guiding tube cooperates with the shaft guide to maintain the latter on the central axis of the device when the shaft guide is translated forwards, and the sum of the length of the guiding tube and of the length of the shaft guide being greater than the extension of the longitudinal cavity of the first module.

The presence of the shaft guide, with a suitable length, makes it possible to avoid introducing the shaft inside the longitudinal cavity of the first module before the shaft has been correctly centred using the guiding tube. This makes it possible to remove the risks of contact of the shaft with the walls of the longitudinal cavity in the first module.

Advantageously, the shaft guide slide inside the guiding tube until an axial abutment of the shaft guide is in contact with said first end of the guiding tube.

The sliding of the shaft guide in the guiding tube makes it possible to easily achieve the centring of the shaft guide and therefore of the shaft during the progression thereof. The abutment prevents the guiding tube from entering into contact with the shaft.

Advantageously, the shaft guide comprises a recess at a given distance from said axial abutment and the guiding tube comprises spaces located substantially at the same distance from the first end thereof, so as to give an outer radial access to the recess.

The presence of the recess makes it possible to grip the shaft guide to exert a longitudinal force on it during docking phases where a compression of the second module on the first module is desired to be carried out.

Preferably, the device comprises longitudinal clamping means fixed to the centring element by a second end of the latter opposite the first end thereof, said clamping means comprising axial pins adapted to pass through the spaces of the guiding tube and to cooperate with the recess of the shaft guide in order to apply to the latter a force along the central axis.

Advantageously, the clamping means are supported by a part which can be disconnected from the centring element.

This makes it possible to limit the weight of the centring element during the handling thereof to install it in the hollow hub.

Preferably, the device further comprises an element configured to be fixed on the centring element or a clamping element fixed to the centring element and a casing element of the first module, so as to prevent the rotation of the device about the longitudinal axis.

The invention also relates to a method for assembling a turbine engine using a device according to the preceding description, the turbine engine comprises at least one first module comprising a longitudinal cavity, opening at the front in a hollow hub and passing through the first module following a longitudinal axis of the hollow hub to a rear end, and at least one second module with a shaft, said shaft needing to be engaged in said longitudinal cavity through said rear end to an assembly position, characterised in that it comprises the following steps:

installation of the centring element in the hollow hub, the guiding tube being in the first position or absent from the centring element;

sliding of the guiding tube through the centring element to the rear position;

docking of the second module to a position where a free end of the shaft or a shaft guide fixed to the shaft enters into the rear end of the guiding tube, such that the guiding tube guides the shaft along the longitudinal axis of the hollow hub;

longitudinal translation of the second module with a progression of the shaft centred on the longitudinal axis of the hollow hub through the guiding tube, to the assembly position.

As indicated above, the modules can be other than those described in introduction and the hollow hub can be a fixed part or a part which is rotatable.

BRIEF DESCRIPTION OF THE FIGURES

The present invention will be better understood and other details, features and advantages of the present invention will appear more clearly upon reading the following description of a non-limiting example, in reference to the appended drawings, in which.

DESCRIPTION OF AN EMBODIMENT

The tool according to the invention is intended to be able to be used in particular during a mounting phase illustrated in FIG. 1, already described in the introduction. Before describing the tool and the manner to use it, the type of turbine engine to which it is applied must be briefly specified.

Figure 2:
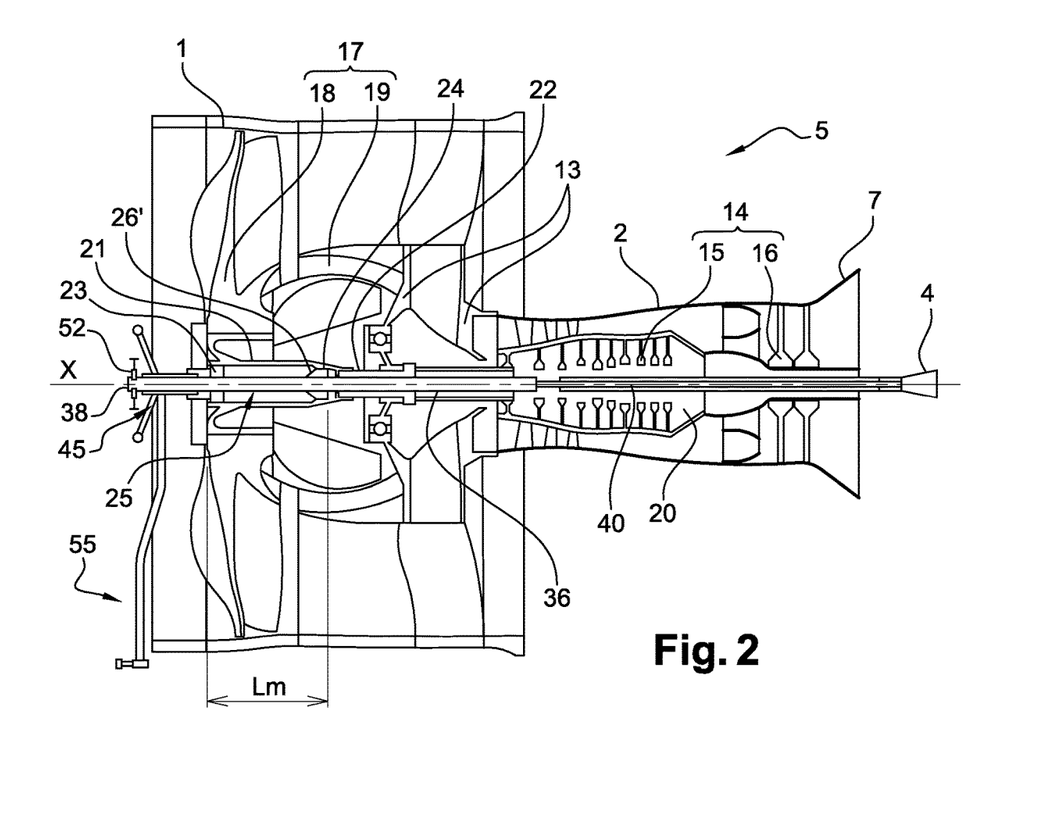
FIG. 2 shows a longitudinal cross-section of a first turbine engine module equipped with a tool according to the invention, with the shaft guide of FIG. 6 introduced at the rear.

FIG. 2 shows the first module 5 such as defined above, i.e. the upstream fan body 1 and the HP body 2 assembled, with the tool installed for a mounting phase. The first module 5 comprises a fixed structure 13, here termed the first casing, which supports the rotating portions 14 of the HP body 2, here the high-pressure compressor 15 and the high-pressure turbine 16, as well as the rotating portions 17 of the upstream fan body 1, intended to be driven by the LP shaft 4, here the fan 18 and the low-pressure compressor 19. The LP module 3 is not represented in the figure. Only the front end of the LP shaft 4 is represented, outside of the rear of the first module 5.

The elements of the first module 5 maintain a longitudinal cavity 20, centred on the axis X of symmetry of the first module 5 and which passes through it on either side. At the front of the module 5, the longitudinal cavity 20 ends in a hollow hub 21, which here is integral with the rotating portions 17 of the upstream fan body 1. At the rear of the hollow hub 21, coupling means 22 of these rotating portions 17 with the LP shaft 4 are installed in the longitudinal cavity 20. At the rear of these coupling means 22, the minimum diameter of the longitudinal cavity 20 is substantially greater than that of the LP shaft 4, so as to let it pass without friction. There is no bearing maintaining the LP shaft in the longitudinal cavity 20 of the first module 5, between said coupling means 22 at the rotating portions of the upstream fan body 1 and the rear of the HP body 2. Here, it will be noted that the surfaces of the parts of the first module 5 delimiting the longitudinal cavity 20 are treated with an anti-corrosion coating which can be altered in case of contact during the passage of the LP shaft 4 or of a shaft guide 10, during mounting.

The hollow hub at the front of the coupling means has a significant longitudinal extension Lm. In the example, this extension Lm is at least as large as that of the mobile rotor of the fan 18. The inner portion of the body of the hollow hub 21 is cylindrical, with a diameter which is substantially wider than that of the longitudinal cavity 20 at the level of said coupling means 22. The inner portion of the hollow hub comprises, at the level of the end thereof opening onto the front, splines 23 intended to form the first elements of a connection by engaging with a part being fixed at this place. The rear end of the inner portion of the hollow hub 22 comprises a contact surface 24, here substantially cylindrical, intended to form a support for a part being housed inside this contact surface to be centred on the longitudinal axis X. The geometries of the contact surface 24 and slot elements 23 of the engaged connection are defined in connection with the longitudinal extension Lm of the hollow hub 21 such that the longitudinal axis X' of a part fixed between these two means coincides with the longitudinal axis X of the first module 5 according to the precision demanded for the mounting operations. In reference to the figures cited in the introduction, this precision corresponds typically to a minimum clearance of 0.5 mm at the level of the LP shaft and a clearance of 0.08 mm at the level of the labyrinth seals.

It will also be noted that the inner surface of the hollow hub 21 is treated, like the assembly of the longitudinal cavity 20 with an anti-corrosion coating, except for the elements 23 of the engaged connection and of the contact surface 24. The elements 23 of the engaged connection are formed of aluminium. The contact surface 24 is covered with a material termed "synthetic metal", formed of intrinsically conductive polymers.

The tool according to the invention comprises several elements engaging during successive steps of the docking must which can be disconnected from one another.

The first element 25, termed centring element, is a part intended to be installed in the inner portion of the hollow hub 21, so as to centre the other elements and the LP shaft 4 on the longitudinal axis X of the first module 5. In reference to FIG. 3, this is a tubular part of revolution about an axis X', having an inner cylindrical cavity, of a diameter Dc of value less than the smallest value of the diameter of the central cavity 20 of the first module 5. The central body of the element 25 has an outer diameter substantially less than that of the inner surface of the hollow hub 21. The element 25 comprises, at a longitudinal end 26', a substantially cylindrical outer contact surface and of diameter equal to that of the contact surface 24 in a hollow hub 21 of the first module 5, and, at the opposite end, splines 27 forming engaged connection elements shaped to engage with the slot elements 23 of the hollow hub 21, in order to form an engaged connection. These two means 26, 27 are spaced along the longitudinal axis X' by a distance substantially equal to that existing between the corresponding means 23, 24, on the hollow hub 21 along the longitudinal axis X. In this manner, the centring element 25 can be inserted through the front of the first module 5 in the hollow hub 21 so that, when the engaged connection is formed between the corresponding elements 23 and 27, the contact surface 24 inside the hollow hub 21 and that 26 outside of the centring element 25 are in contact, maintaining the latter in a position where the axis X' thereof coincides with the longitudinal axis X of the first module 5 according to the desired precision.

Figure 3:
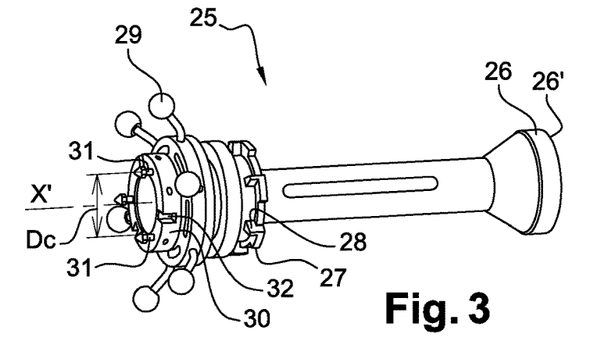
FIG. 3 shows a perspective view of a centring element belonging to the tool according to the invention.

The contact surface 26 of the centring element 25 is treated with the same material termed "synthetic metal" as the contact surface 24 of the hollow hub 21. The means 27 engaging with those 23 of the hollow hub 21 for the engaged connection here are made of aluminium, like the latter. As can be seen in FIG. 3, the splines 27 comprise abutments 28 in rotation to stop the splines 27 of the centring element 25 facing those of the splines 23 of the hollow hub 21 when the engaged connection is formed.

The centring element 25 also comprises a head, placed at the end thereof at the front of the means for the engaged connection. This test is intended to remain outside of the hollow hub. It comprises radial arms 29 shaped to be able to be gripped in the hand and to exert a rotation force in order to lock the engaged connection, once the splines 27 are engaged behind those 23 of the corresponding means on the hollow hub 21. The head also comprises, at the free end thereof, in this example, a flat disk 30 carrying threaded longitudinal pins 31 distributed circumferentially, and an outer notch 32 at the periphery. This assembly forms means arranged to engage with those of a second part, described below, and to form together a "quarter-turn" connection which secures said second part to the centring element.

Figure 4:
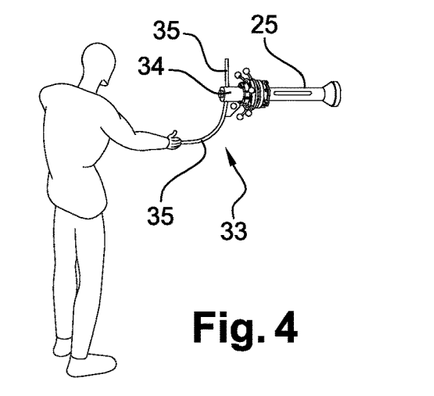
FIG. 4 schematically shows the handling of the centring element of FIG. 3 with a handling tool.

Advantageously, the weight of the centring element 25 is limited to be able to be handled by one single operator. However, given the stresses that it must support, this weight, typically 12 kg, can lead to a significant lever effect when this is about supporting the element through an end to introduce it in the hollow hub 21. Advantageously, in reference to FIG. 4, a complementary handling tool 33 can be used. This is a tool comprising a longitudinal rod 34 designed to be introduced inside the centring element 25, comprising at the end thereof, two arms 35 extending radially and intended for gripping. As indicated in FIG. 4, the handling tool 33 makes it possible to easily maintain the centring element 25 substantially horizontally, in order to introduce it into the hollow hub 21.

Figure 5:
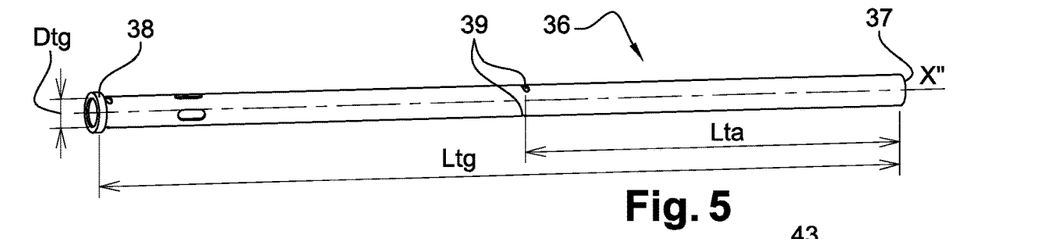
FIG. 5 shows, in perspective, a guiding tube belonging to the tool according to the invention.

In reference to FIG. 5, the second element of the tool is a guiding tube 36 arranged to slide inside the cylindrical cavity of the centring element 25 by remaining in contact with it, so as to move it longitudinally by remaining centred on the axis X' of the first element 25. The outer diameter of the body of the guiding tube 36 is therefore equal to that Dc of the cylindrical cavity of the centring element 25. In addition, one of the ends thereof, termed rear end 37 has an outer diameter less than or equal to the tubular body, so that the guiding tube 36 can be introduced into the centring element 25 through the front end of the latter. The guiding tube 36 has a length Ltg defined so that it substantially stands proud from the rear end of the centring element 25 when it is slid rearwards and that the opposite end thereof, or front end, stands proud from the front end of the centring element 25. In the example considered, the length Ltg of the guiding tube 36 is substantially greater than the distance separating the front end of the first module 5 and the front of the HP body 2, so as to move closer to the rear end of the first module 5.

The guiding tube 36 is hollow, of diameter Dtg, so as to receive through the rear end 37 thereof, a rod which slides there to remain centred on the longitudinal axis X" of the guiding tube 36. The front end of the guiding tube 36 here comprises a ring 38 of diameter greater than that of the tube, so as to form a longitudinal abutment on the guiding tube 36. At a determined distance Lta from the rear end 37 thereof, the guiding tube 36 comprises transversal spaces 39, arranged to let pins pass radially.

Figure 6:
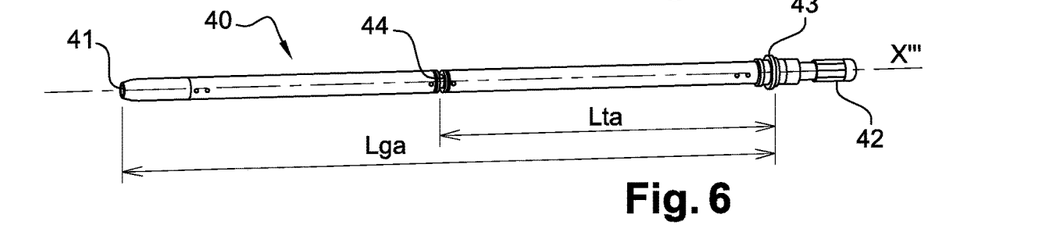
FIG. 6 shows, in perspective, a shaft guide used in the tool according to the invention.

Advantageously, to avoid sinking the LP shaft 4 into the first module 5, a shaft guide element 40, represented in FIG. 6, is intended to be fixed to said LP shaft 4. The shaft guide 40 forms a rod adapted to be inserted through a front end 41 in the rear end 37 of the guiding tube 36 and to slide inside the latter by remaining centred on the axis X" thereof. The rear end thereof comprises a head 42 adapted to be fixed to the front of the LP shaft 4 and comprises an axial abutment 43 intended to block the sliding of the shaft guide 40 in the guiding tube 36. The length Lga of the shaft guide 40, matching the design of the guiding tube 36, is defined such that the length Ltg of the guiding tube 36 added to that Lga of the shaft guide 40 is substantially greater than that of the first module 5 along the longitudinal axis X, so that the head 42 of the rear end of the shaft guide 40 stands proud from the rear end of the first module 5 while the front end 38 of the guiding tube 36 stands proud from the front of the first module 5, when these elements are put end-to-end in the longitudinal cavity 20. In addition, the shaft guide 40 has a recess 44 intended to engage with radial pins to block the longitudinal movement thereof. This recess 44 is at a distance from the axial abutment 43 substantially equal to that Lta which separates the spaces 39 of the guiding tube 36 of the rear end 37 of the latter, such that the recess 44 and the spaces 39 match when the shaft guide 40 abuts on the rear 37 of the guiding tube 36 and that the spaces 39 let radial pins pass outside to the recess 44. It will be noted that this distance is substantially greater than the longitudinal extension of the centring element 25 so that the recess stands proud from the latter through the front when the shaft guide 40 is slid forwards from the first module to the rear head 42 thereof, comes to the position behind the centring element 25 and brings the LP shaft 4 facing the coupling means 22 with the rotating elements 17 of the front fan module 1. In this case, said pins supposed to block the axial movement of the shaft guide 40 can be inserted outside of the centring element 25, at the front of the first module 5.

Figure 7:
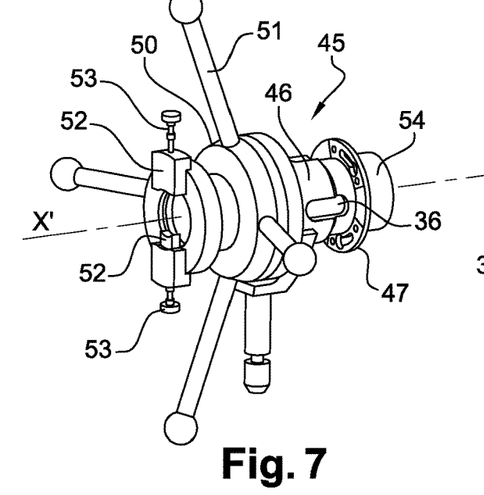
FIG. 7 shows, in perspective, a compression key used in the tool according to the invention.
Figure 8:
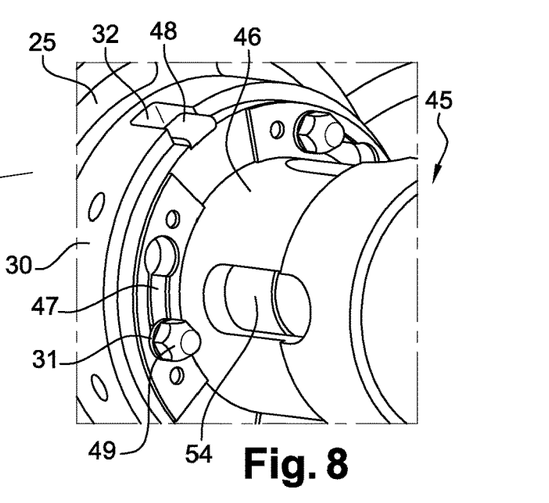
FIG. 8 shows, in perspective, a detail of the fixing of the compression key of FIG. 7 on the centring element of FIG. 3.

Advantageously, the tool also comprises an element termed compression key 45 which is fixed to the front of the centring element 25 by the quarter-turn connection indicated above with threaded longitudinal pins 31. The tubular body 46 is thus centred on the central axis X' of the centring element 25. In reference to FIG. 7, this element 45 comprises a tubular body 46 supporting circumferential splines 47 arranged to engage with the longitudinal pins 31 of the front head 30 of the centring element 25, to form the quarter-turn connection, as indicated in FIG. 8. In reference to FIG. 8, the compression key 45 also comprises an anti-rotation finger 48 which is engaged in the outer notch 32 of the centring element 25 when the longitudinal pins 31 are correctly positioned in the circumferential splines 47. The quarter-turn connection is then locked by nuts 49 clamped on the threaded longitudinal pins 31.

The tubular body 46 of the compression key 45 supports a capstan 50 with radial arms 51 arranged to be manually rotated. The rotation of the capstan 50 makes it possible to impress on it a longitudinal movement at the front or at the rear along the central axis X', relative to the tubular body 46.

The tubular body 46 and the capstan 50 are designed to free up a longitudinal cavity in the axis X' of the centring element 25 and of sufficient diameter to let the guiding tube 36 pass.

The front end of the capstan 50 brings a system here comprising two pins 52 which are radially mobile and which can be placed, either in a "removed" position, where they are at a distance from the central axis X' equal to half the diameter of the central cavity of the centring element and free up the central longitudinal cavity, or in an "engaged" position, where they can plug into the recess 44 of the shaft guide 40 to block it longitudinally. The pins 52 are completed by a mechanical system 53 making it possible to lock them to exert a radial force on the outer surface of the guiding tube 36.

Advantageously, the body 46 of the compression key 45 comprises longitudinal spaces 54 which makes it possible to monitor the progression of the shaft guide 36 in the compression key.

In the example, the compression key 45 is designed with a sufficiently low weight, typically 4 kg, to be able to be easily handled during the fixing thereof on the centring element 25.

When the compression key 45 is assembled to the centring element 25 and when the pins 52 are in the removed position, the assembly therefore forms a member through which the guiding tube 36 and the shaft guide 40 can slide longitudinally, along the axis X' of the centring element 25. In particular, if it is considered that the guiding tube 36, the latter, once introduced at the front of this member through the rear end 37 thereof, can be located in two notable positions between which it can slide. In a first position, termed waiting position, illustrated in FIG. 9, it is supported in the member, but the rear end thereof does not stand proud from the rear end 26' of the centring element 25. In a second position, illustrated in FIG. 10, the guiding tube 36 stands proud from the rear end 26' of the centring element 25 and the head 38 thereof located at the front end is abutted on the pins 52 of the compression key 35. It will be noted that the guiding tube 36 can be blocked in this position by clamping the pins 52 on the outer surface thereof by mechanical means 53 provided for this purpose.

Figure 15:
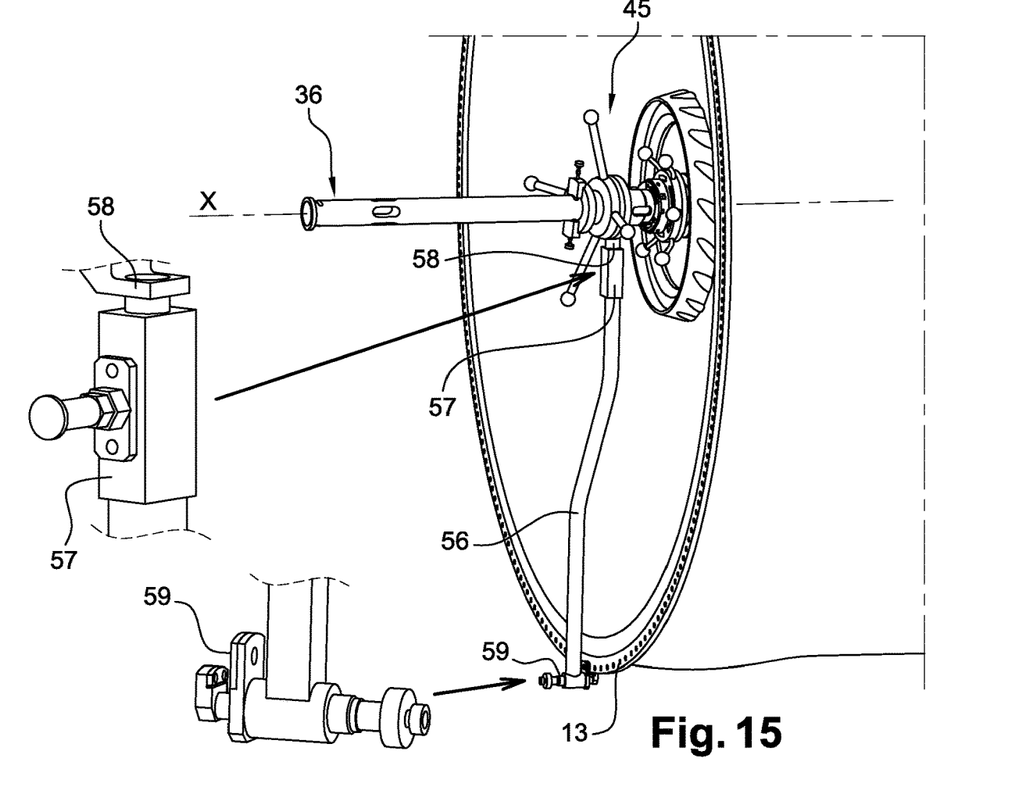
FIG. 15 shows a step of the method according to the invention wherein the anti-rotation bar of FIG. 11 is installed on the elements of the tool according to the invention mounted as indicated in FIG. 14.

Preferably, the hollow hub 21 on which the centring element 25 must be fixed being rotatable, the tool also comprises an element 55 preventing the rotation of the assembly. In reference to FIG. 11, this anti-rotation element 55 is composed here of a removable transversal bar 56. As illustrated in FIG. 15, the anti-rotation bar 56 comprises, at an end, a fixing 57 arranged to receive a pin 58 provided for this purpose on the compression key 45 and, at the other end thereof, a clamp 59 intended to fasten the casing 13, at the periphery of the fan 18.

Such a tool can be used to ensure correct centring of the second module 3 during the docking in the first module 5. FIG. 1 described above illustrates a mounting wherein the first module 5 is supported fixed, here under a gate 8, with the longitudinal axis X thereof horizontally and the second module 3 is supported by a hoist 9 supported by said gate 8, mobile in translation so as to carry out the docking.

Preferably, the mounting method according to the invention starts through the fitting of the first module 5 with the corresponding elements of the tool, the first module 5 being supported horizontally under the gate.

Figures 11, 12:
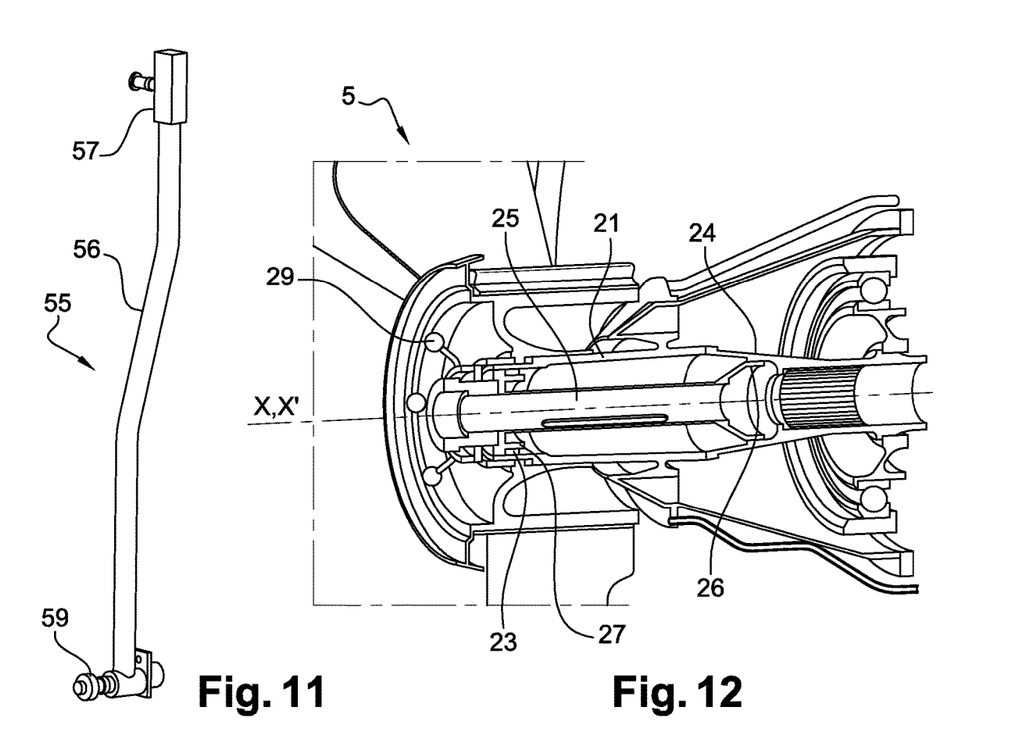
FIG. 11 shows an anti-rotation bar used in the tool according to the invention.
FIG. 12 shows, with a longitudinal cross-section, the result of a step of the method according to the invention wherein the centring element of FIG. 3 has been installed on the first module of the turbine engine.

In a first step, the centring element 25 is installed in the hollow hub 21 at the front of the first module 5. For this, the operator installs the handling tool 33 described above as indicated in FIG. 4 and horizontally introduces the centring element 25 in the hollow hub 21 until the splines 27 of the element pass through the corresponding splines 23 of the engaged connection on the hollow hub and that the contact surface 26 of the centring element 25 bears on the contact surface 24 of the hollow hub 21. Then, after having removed the handling tool 33, the operator rotates the centring element 25 about the longitudinal axis X using radial arms 29, until the abutments 28 of the engaged connection block the movement. At the end of this step, as illustrated in FIG. 12, the centring element 25 is therefore fixed in the hollow hub 21 by the engaged connection with support from the contact surfaces 24, 26 and the longitudinal axis X' thereof is combined with the longitudinal axis X of the hollow hub 21.

Figure 13:
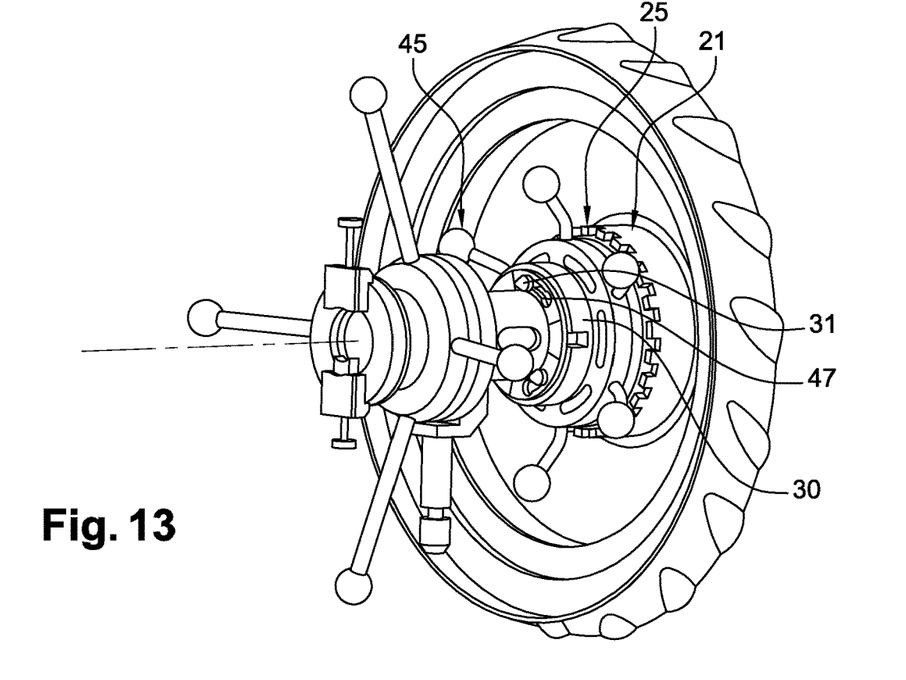
FIG. 13 shows the result of a step of the method according to the invention wherein the compression key of FIG. 7 has been installed on the centring element mounted as indicated in FIG. 12.

In a second step, the compression key is installed on the centring element by locking the quarter-turn connection 30, 31, 47, described above. At the end of this step, as illustrated in FIG. 13, the assembly formed of the centring element 25 and the compression key 45 is fixed on the front of the hollow hub 21.

Figure 9:
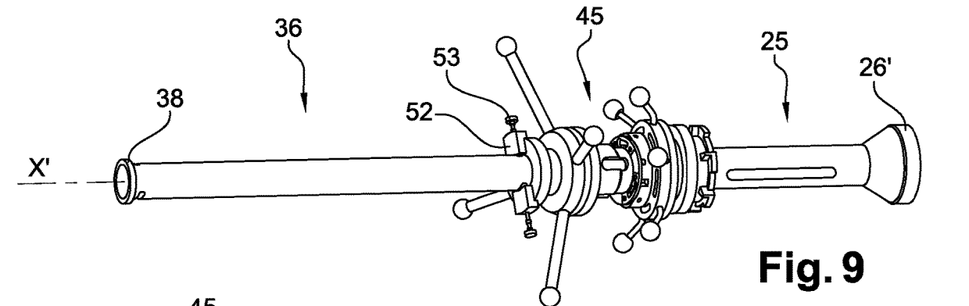
FIGS. 9 and 10 show, in perspective, two positions of the guiding tube of FIG. 5 relative to the assembly formed of the centring element of FIG. 3 and of the compression key of FIG. 7.
Figure 14:
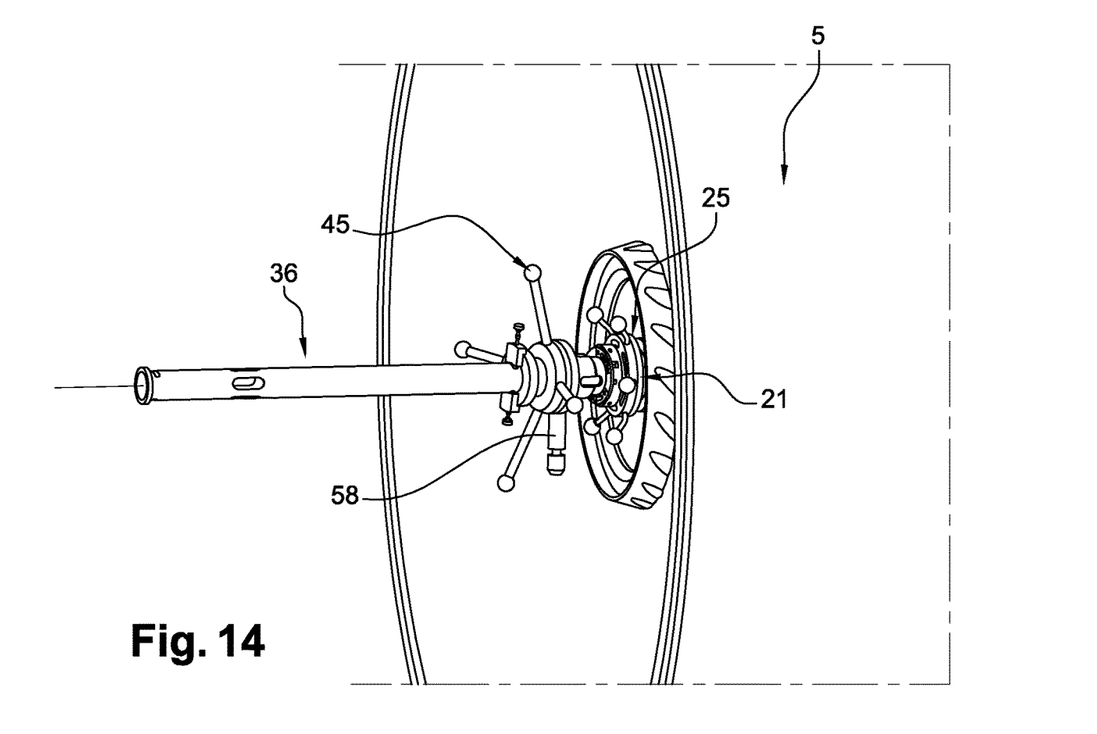
FIG. 14 shows a step of the method according to the invention wherein the guiding tube of FIG. 5 is installed in the compression key and the centring element mounted as indicated in FIG. 13.

In a third step, in reference to FIG. 14, the operator engages the guiding tube 36 through the rear end 37 thereof in the assembly formed of the centring element 25 and the compression key 45, until installing it in the waiting position described in FIG. 9.

In a fourth step, the anti-rotation bar 56 is installed as illustrated in FIG. 15. It is first engaged in the corresponding pin 58 of the compression key 45, then fixed at the periphery of the casing 13 by the clamp 59 thereof.

Figure 10:
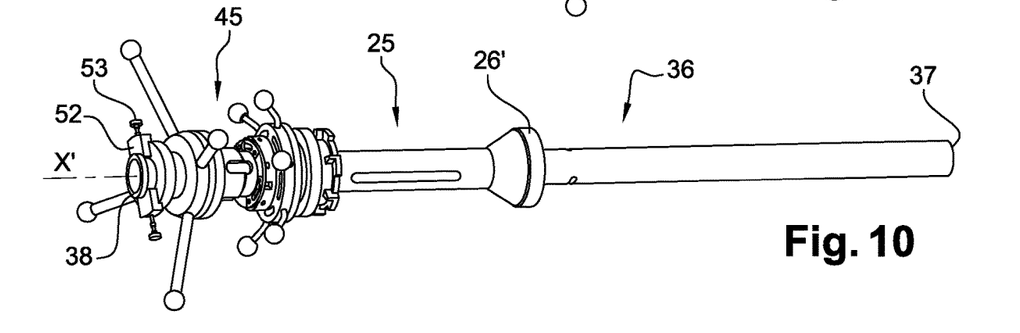

In a fifth step, the guiding tube 36 is slid rearwards in the second position described in FIG. 10, with the head 38 thereof abutted on the pins 52 of the compression key 45. The latter are born on the outer surface thereof, so as to block a sliding of the guiding tube 36 forwards. At the end of this step, as illustrated in FIG. 2, the first module is equipped, ready to receive the shaft guide 40 for the docking of the second module 3.

In a step which can be carried out at the same time at the preceding steps, the shaft guide 40 is fixed through the rear end thereof on the front end of the LP shaft 4, of the second module 3.

In a sixth step, illustrated in FIG. 1, the second module 3, supported here by a mobile hoist 9, is presented horizontally in front of the rear of the first module 5. An operator monitors and assists with introducing the shaft guide 40 into the longitudinal cavity 20 of the first module 5, so that the shaft guide 40 progresses horizontally in the longitudinal cavity 20 until the end 41 thereof before going back into the guiding tube 36. As illustrated in FIG. 2, the shaft guide 40 is thus centred on the longitudinal axis X of the first module 5 by the guiding tube 36 even though the LP shaft 4 of the second module 3 is not yet introduced into the longitudinal cavity 20. Then, the shaft guide 40 slides into the guiding tube 36 until the axial abutment 43 thereof reaches the rear end 37 of the guiding tube 36.

Figure 16:
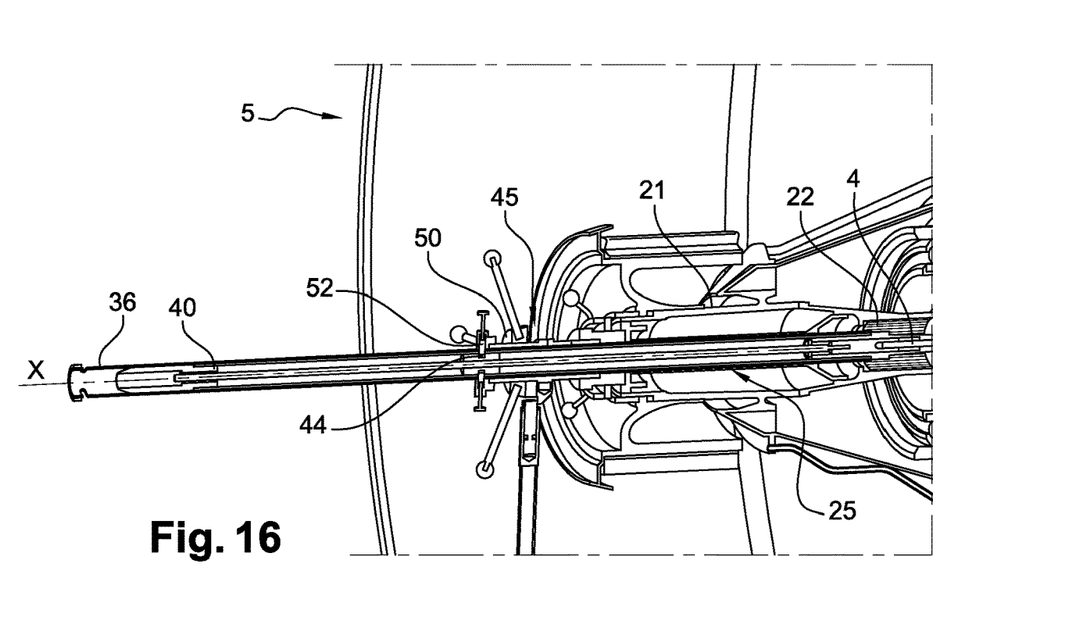
FIG. 16 shows, with a longitudinal cross-section, the result of a step of the method according to the invention wherein the shaft guide of FIG. 6 has passed through forwards the elements of the tool according to the invention after having been introduced as indicated in FIG. 2.
Figure 17:
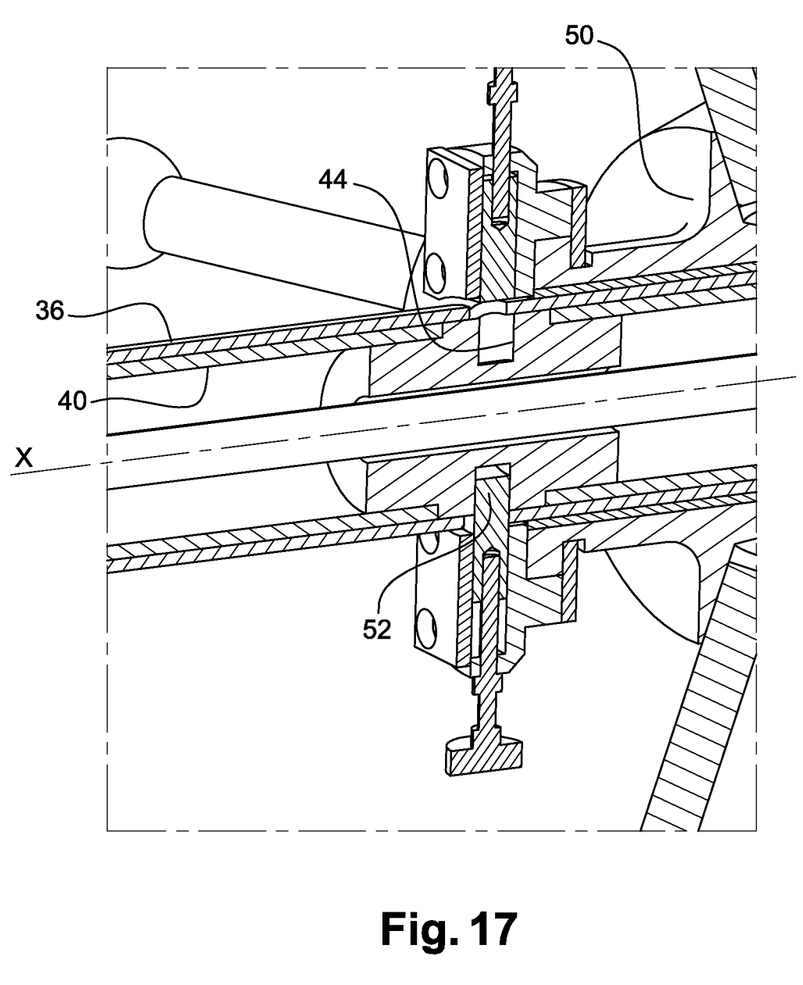
FIG. 17 shows a detail of FIG. 16 at the level of the interaction between the shaft guide of FIG. 6 and the compression key of FIG. 7.

In a seventh step, the pins 52 which block the guiding tube 36 are unlocked and the second module 52 is progressed forwards by maintaining it centred on the longitudinal axis X of the first module 5. The shaft 4 of the second module 3 thus pushes the shaft guide 40 and the guiding tube 36 forwards. With the shaft guide being supported on the longitudinal axis X by the guiding tube 36, the assembly does not risk hitting the walls of the longitudinal cavity 20 under the effect of swing due to the progression of the second module 3. The progression is stopped when the recess 44 of the shaft guide 40 faces the pins 52 located on the capstan 50 of the compression key 45, as illustrated in FIG. 16. The head of the shaft 4 of the second module 3 is thus also engaged in the coupling means 22 with the rotating elements 17 of the front fan module. Thus, the pins 52 are inserted in the recess 44 of the shaft guide 40 to secure the latter with the capstan 50 following the longitudinal axis X, as illustrated in FIG. 17.

In an eighth step, the last centimetres of longitudinal progression of the shaft 4 and of the second module 4 are achieved by manually actuating the capstan 50, to insert the head of the shaft in the coupling means 22 of the rotating elements 17 of the front fan shaft and to control the precise coupling of the elements of the labyrinth seals to the interface of the first 5 and of the second 3 modules, until the flanges 6, 7 of said modules are fixed together.

Here, it will be noted that the compression key 45 can also be used in the opposite direction, during the dismounting of the engine, to decouple the two modules 3, 5 before separating them.

The tool, of which the elements can thus be dismounted from the two modules, has thus made it possible to dock by respecting the desired centring precisions and by avoiding contacts likely to damage the elements of either of the two modules. As mentioned above, the tool can also be used during the dismounting of the turbine engine, to avoid unintentional contact during the translation of the second module 3 relative to the first module 5.

The invention claimed is:

1. A device for assembling a turbine engine, the device being configured to center a shaft of a second module relative to a longitudinal axis (X) of a hollow hub placed at a front of a first module, the first module comprising a longitudinal cavity following the longitudinal axis (X), opening at the front in the hollow hub and passing through the first module following the longitudinal axis (X) to a rear end of the first module, the shaft configured to be inserted in the longitudinal cavity through the rear end of the first module, the device comprising:
a centering element having a central axis (X') and comprising a first end and a second end opposite said first end of the centering element with respect to the central axis (X'), wherein the first end of the centering element is configured to be inserted into the hollow hub such that the central axis (X') coincides with the longitudinal axis (X);
a guiding tube configured to enter into at least one portion of the longitudinal cavity of the first module, at a rear of the hollow hub, wherein the guiding tube is configured to slide inside the centering element along the central axis (X'), between a first position, wherein the guiding tube is entirely on a side of the centering element relative to the first end of the centering element, and a rear position, wherein the guiding tube extends from the first end of the centering element so as to penetrate into the longitudinal cavity towards the rear end of the first module when the centering element is placed in the hollow hub, and
a shaft guide having a first end that is inserted inside the guiding tube, the shaft guide configured to be fixed to the shaft of the second module through a second end of the shaft guide, the device being configured so that the guiding tube cooperates with the shaft guide to maintain the shaft guide on the central axis (X') of the device when the shaft guide is translated forwards.

2. The device according to claim 1, wherein the shaft guide is configured to slide inside the guiding tube until an axial abutment of the shaft guide is in contact with the first end of the guiding tube.

3. The device according to claim 2, wherein the shaft guide comprises a recess at a first distance from the axial abutment, and wherein the guiding tube comprises spaces located substantially at a second distance from the first end thereof so as to give an outer radial access to the recess, wherein the first distance is equal to the second distance.

4. The device according to claim 3, further comprising axial pins adapted to pass through the spaces of the guiding tube and to cooperate with the recess of the shaft guide in order to block movement of the shaft guide along the central axis (X').

5. The device according to claim 1, further comprising a clamp proximate the second end of the centering element, the clamp supported by a part which can be disconnected from the centering element.

6. The device according to claim 1, further comprising an anti-rotation element configured to be fixed on the centering element or on a clamp fixed to the centering element and capable of being fixed to a casing of the first module so as to prevent rotation of the device about the longitudinal axis (X).

7. A method for assembling a turbine engine using the device according to claim 1, the turbine engine including the first module the method comprising:
installing the centering element in the hollow hub, the guiding tube being in the first position or absent from the centering element;
sliding the guiding tube through the centering element to the rear position;
docking the second module to a position where a free end of the shaft or a shaft guide fixed to the shaft enters into the rear end of the guiding tube, such that the guiding tube guides the shaft along the longitudinal axis (X) of the hollow hub; and
translating longitudinally the second module with a progression of the shaft centered on the longitudinal axis (X) of the hollow hub through the guiding tube to the assembly position.

8. The device according to claim 1, wherein a sum of a length (Ltg) of the guiding tube and of a length (Lga) of the shaft guide is greater than an extension of the longitudinal cavity of the first module.

9. The device according to claim 1, wherein the guiding tube is entirely beyond the second end of the centering element in the first position.

10. The device according to claim 1, wherein a first end of the guiding tube is entirely beyond and upstream from the second end of the centering element in the first position, and said first end of the guiding element extends downstream from the second end of the centering element in the rear position.

11. A device for assembling a turbine engine, the device configured to center a shaft of a second module relative to a longitudinal axis (X) of a hollow hub placed at a front of a first module, the first module comprising a longitudinal cavity following the longitudinal axis (X), opening at the front in the hollow hub and passing through the first module following the longitudinal axis (X) to a rear end of the first module, the shaft configured to be inserted in the longitudinal cavity through the rear end of the first module, the device comprising:
- a centering element having a central axis (X') and comprising a first end and a second end opposite to said first end of the centering element in respect to the central axis (X'), wherein the centering element is configured to be inserted in the hollow hub in order to make the central axis (X') coincide with the longitudinal axis (X); and
- a guiding tube configured to enter into at least one portion of the longitudinal cavity of the first module, at a rear of the hollow hub, wherein the guiding tube is configured to slide inside the centering element along the central axis (X'), between a first position wherein the guiding tube is entirely on one side of the centering element relative to the first end of the centering element, and a rear position wherein the guiding tube extends from the first end of the centering element so as to penetrate into the longitudinal cavity when the centering element is placed in the hollow hub; and
- a shaft guide having a first end configured to be inserted inside the guiding tube and a second end configured to be fixed to the shaft of the second module,
wherein the device is configured so that the guiding tube cooperates with the shaft guide to maintain the shaft guide on the central axis (X') of the device when the shaft guide is translated forwards, and
wherein a sum of a length (Ltg) of the guiding tube and of a length (Lga) of the shaft guide being greater than an extension of the longitudinal cavity of the first module.

12. The device according to claim 11, wherein a first end of the guiding tube is adapted to go back into the centering element through the second end of the centering element such that the first position of the guiding tube corresponds to a disconnection thereof from the centering element.

13. The device according to claim 11, wherein the centering element comprises first means configured to engage the hollow hub, located at the first end of the centering element, and second means located in proximity of the second end of the centering element and configured to cooperatively lock with the hollow hub.

* * * * *